(12) United States Patent
Smallwood et al.

(10) Patent No.: US 7,522,523 B2
(45) Date of Patent: Apr. 21, 2009

(54) ASSIGNING PACKET QUEUE PRIORITY

(75) Inventors: Mark A. L. Smallwood, Beaconsfield (GB); Joe Regan, Pleasanton, CA (US); Akhil Duggal, Los Altos, CA (US); Sofronis Sofroniou, London (GB); Richard Todd, St. Albans (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 800 days.

(21) Appl. No.: 10/831,721

(22) Filed: Apr. 23, 2004

(65) Prior Publication Data
US 2004/0213156 A1  Oct. 28, 2004

Related U.S. Application Data

(60) Provisional application No. 60/465,525, filed on Apr. 25, 2003.

(51) Int. Cl.
*H04L 12/26* (2006.01)
*H04L 1/00* (2006.01)

(52) U.S. Cl. .............. 370/235; 370/230.1; 370/232
(58) Field of Classification Search ......... 307/229–232, 307/235
See application file for complete search history.

(56) References Cited

U.S. PATENT DOCUMENTS 7,133,406 B2* 11/2006 Konuma ............... 370/395.42
2005/0201284 A1* 9/2005 Cheriton .................. 370/232

FOREIGN PATENT DOCUMENTS

| EP | 1 215 931 A1 | 6/2002 |
| GB | 2 377 117 A | 12/2002 |
| WO | WO 01/28169 A1 | 4/2001 |

* cited by examiner

*Primary Examiner*—Ronald Abelson (57) ABSTRACT

Setting packet queue priority is disclosed. A rate associated with a packet queue is measured. The rate is compared to a quality of service metric. A priority is assigned to the packet queue based at least in part on the comparison between the rate and the quality of service metric. The quality of service metric may be a committed information rate and/or a peak information rate.

19 Claims, 7 Drawing Sheets

ASSIGNING PACKET QUEUE PRIORITY

CROSS REFERENCE TO RELATED APPLICATIONS

This application claims priority to U.S. Provisional Patent Application No. 60/465,525 entitled OPTIMIZING USE OF MEMORY BY A NETWORK TRAFFIC MANAGER filed Apr. 25, 2003 which is incorporated herein by reference for all purposes.

FIELD OF THE INVENTION

The present invention relates generally to network switching. More specifically, a method for setting packet queue priority is disclosed.

BACKGROUND OF THE INVENTION

Current network switching devices typically flow all data traffic through. However, in the case when a particular class of traffic exceeds a prescribed rate or threshold, e.g., as defined by a quality of service guarantee, the network switches typically discard or stop traffic in excess of the prescribed rate. This approach to controlling network traffic flow is sometimes referred to as "policing" the packet flow. Ideally, network service providers should offer customers different quality of service levels for network traffic including a commitment to allowing traffic up to a peak rate and/or committing to a specific rate without ever dropping traffic. In order to achieve these types of different quality of service levels, traffic flows must be properly prioritized through a network switching device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
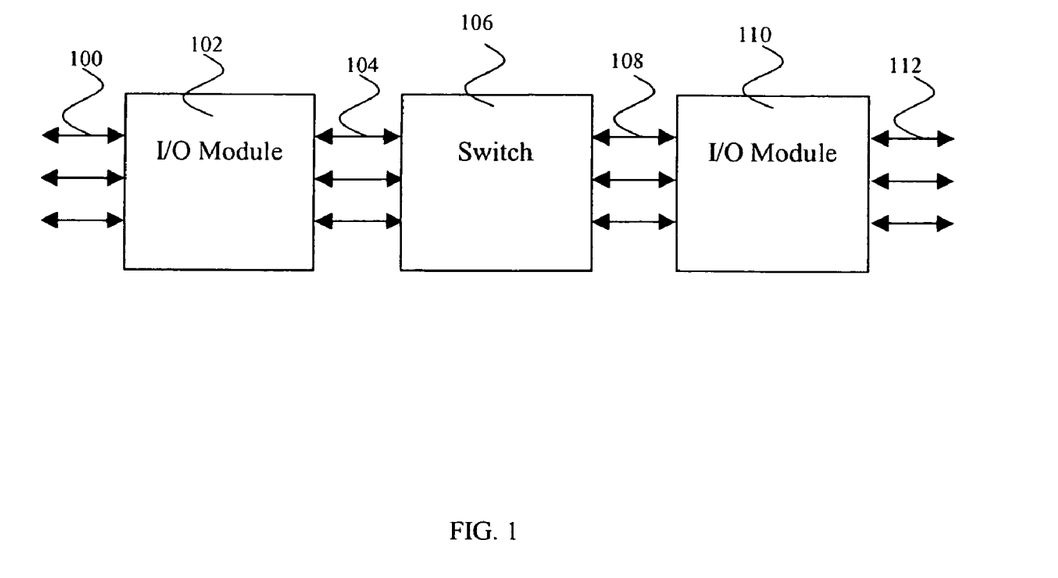
FIG. 1 is a block diagram illustrating a network switching device.

FIG. 1 is a block diagram illustrating a network switch. The switch includes I/O modules 102 and 110 and switch module 106. Packet traffic enters the switch along connections 100 into I/O module 102. Acting as the input I/O module, I/O module 102 processes and queues the packets for switch module 106. When ready the packets are sent across connections 104 to switch module 106, which directs the packet to its proper output I/O module (for example, I/O module 110). Depending on how an individual packet is addressed, the output I/O module may be the same as the input I/O module; but the input and output I/O modules are shown separately in FIG. 1 for clarity. Output I/O module 110 processes and queues each packet for output along the appropriate output connection 112. In some embodiments, the connections 104 and 108 are implemented as backplane connections comprising a chassis into which the I/O modules 102 and 110 and switch module 106 have been inserted. In some embodiments, the I/O modules 102 and 110 comprising line cards, and the connections 100 and 112 comprise jacks or other connectors to which lines may be inserted to connect external networking and/or other equipment may be connected to the switch.

Figure 2:
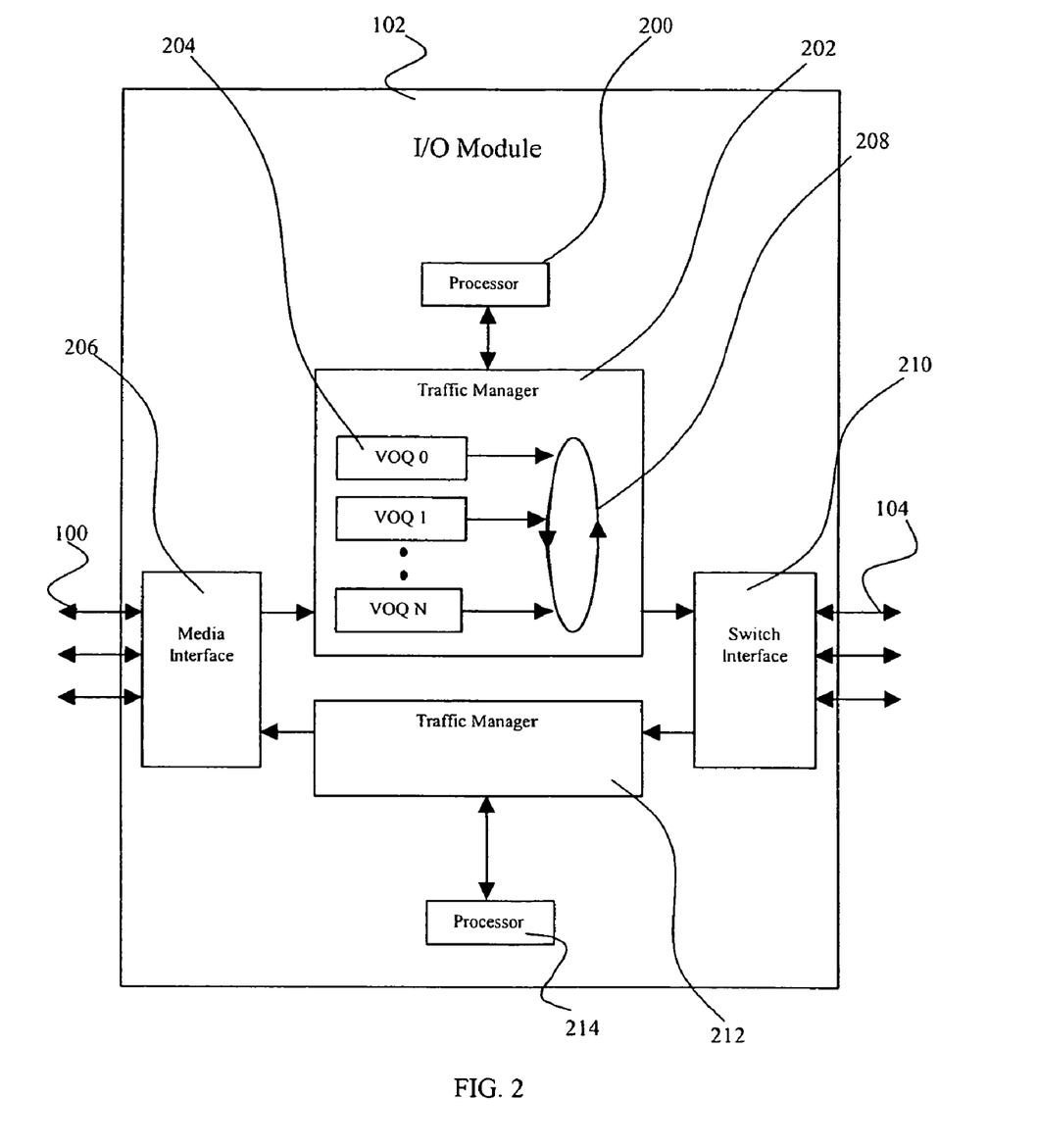
FIG. 2 is a block diagram illustrating the blocks within the I/O module.

FIG. 2 is a block diagram illustrating the blocks within an I/O module used in some embodiments. Packet traffic enters the I/O module from outside the network switch via connections 100 and media interface module 206. Media interface module 206 supports different types of physical and logical network connections such as electrical and optical connections and Ethernet and SONET protocols. In some embodiments, media interface module 206 process packets into a format suitable for being processed by the remaining elements of the I/O module 102. While I/O module 102 is shown in FIG. 2 as comprising one media interface, 206, in other embodiments two or more such modules may be included. Packets then proceed to traffic manager 202. Packets are processed in processor 200 in order to prepare them for their output destination as well as to assign a classification that indicates how they are to be queued for output. Packets are queued in virtual output queues such as VOQ 0 204. Priorities are assigned to packets in the respective virtual output queues by an inter-VOQ scheduling priority process 208. In one embodiment, inter-VOQ scheduling priority process 208 is a round robin process. Packets are sent based on their respective assigned priorities to the switch via switch interface 210 and connections 104.

Outbound packets enter the I/O module from the switch through connections 104 and switch interface 210. Packets then proceed to traffic manager 212. Packets are processed in processor 214 in order to prepare them to be sent to their output destination as well as to determine how they are to be queued for output. Packets are queued in virtual output queues (not shown) and a priority is assigned based on a scheduling priority process. In one embodiment, the scheduling priority process is a round robin. Packets are then sent based on their assigned priority to their destination via media interface 206 and connections 100.

Figure 3:
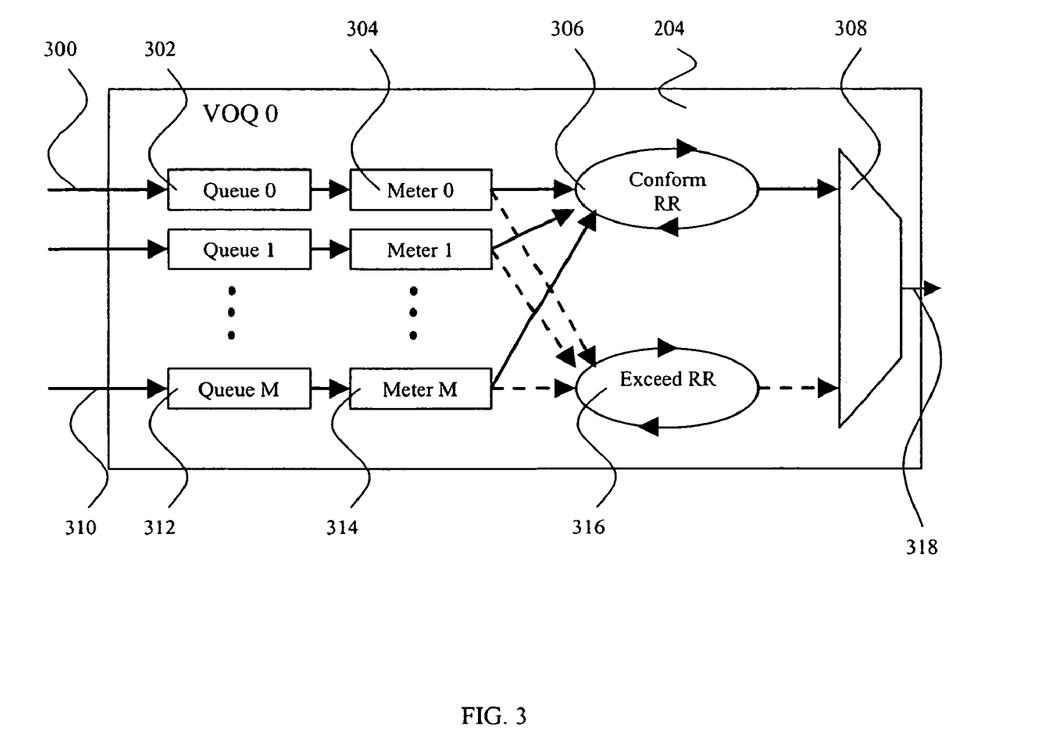
FIG. 3 is a block diagram illustrating a virtual output queue.

FIG. 3 is a block diagram illustrating a virtual output queue (VOQ) as implemented in some embodiments. FIG. 3 is a schematic representation of the processes by which the relative priority of one or more queues associated with the VOQ is determined, as opposed to showing the actual flow of packets from the queues to, e.g., the switch interface (e.g., 210 of FIG. 2) in the case of an ingress traffic manager or the media interface (e.g., 206 of FIG. 2) in the case of an egress traffic manager. One or more packet queues 0 through M are assigned to the VOQ 204, as represented by queues 302 and 312 and arrows 300 and 310. Each queue assigned to the VOQ has associated with it a meter 1 through M (e.g., 304 and 314) configured to measure a packet flow rate associated with the queue. In some embodiments, the rate that is measured is the packet egress rate, i.e., the rate at which packets are taken out of the queue. In other embodiments, the rate that is measured is the packet ingress rate, i.e., the rate at which packets are added to the queue. The meters measure the extent to which the actual packet flow rate compares with one or more metrics, as described more fully below. In some embodiments the meter is implemented as a leaky bucket. Depending on the measured rate of a given queue and a comparison between the measured rate and quality of service guarantees, the queue is assigned a priority relative to other queues associated with the VOQ and, ultimately, relative to queues assigned to other VOQs. In some embodiments, depending on the measurement made by the meter, the packets are either held in the queue (e.g., to ensure that flow does not exceed a peak information rate associated with the queue), assigned a priority as part of a high priority scheduling process such as "conform" round robin process 306 (e.g., to ensure that a committed information rate (CIR) is satisfied), or assigned a priority as part of a low priority scheduling process such as "exceed" round robin process 316 (e.g., to give lower priority to queues for which the actual information rate is greater than or equal to a CIR associated with the queue). The results of the "conform" round robin process 306 and "exceed" round robin process 316 are provided as inputs into a strict priority scheduling process 308. Strict priority scheduling process 308 ensures that any queue that is not currently satisfying its CIR (and has a packet in the queue), i.e., a queue assigned to the "conform" round robin process, is assigned a higher priority than any queue for which the CIR is being met or exceeded, i.e., any queue assigned to the "exceed" round robin process. While the "conform" scheduling process 306 and "exceed" scheduling process 316 are shown in FIG. 3 and described above as comprising round robin processes in some embodiments, in other embodiments, other algorithms or processes may be used, e.g., weighted round robin. Likewise, while scheduling process 308 is described above as comprising a strict priority process in some embodiments, in other embodiments, other scheduling/selection algorithms may be used. The VOQ 204 provides as output 318 the priorities as determined by the strict priority scheduling process 308.

While the embodiment shown in FIG. 3 comprises a higher priority "conform" scheduling process 306 and a lower priority "exceed" scheduling process 316, in some embodiments, three or more different scheduling processes each associated with a different priority may be used. In some such embodiments, the measured packet flow rate is compared to a plurality of metrics associate with each queue, each metric being associated with at least one of the plurality of scheduling processes. The queue is associated with the highest priority scheduling process associated with a metric that is not being satisfied. For example, in an embodiment comprising four scheduling processes having priorities 1 through 4, respectively, with 1 being the highest priority scheduling process and 4 being the lowest, there may be three metrics to which the measured flow rate would be compared, e.g., metrics 1 through 3 corresponding to scheduling processes 1 through 3, respectively. If all three metrics are being satisfied, the lowest priority scheduling process (the priority 4 process) is used. If, for example, metric 1 was being satisfied but metrics 2 and 3 were not, the queue would be associated with the priority 2 scheduling process (i.e., the process associated with metric 2), as being the highest priority scheduling process associated with a metric that is not being satisfied as indicated by the measured packet flow rate.

Figure 4:
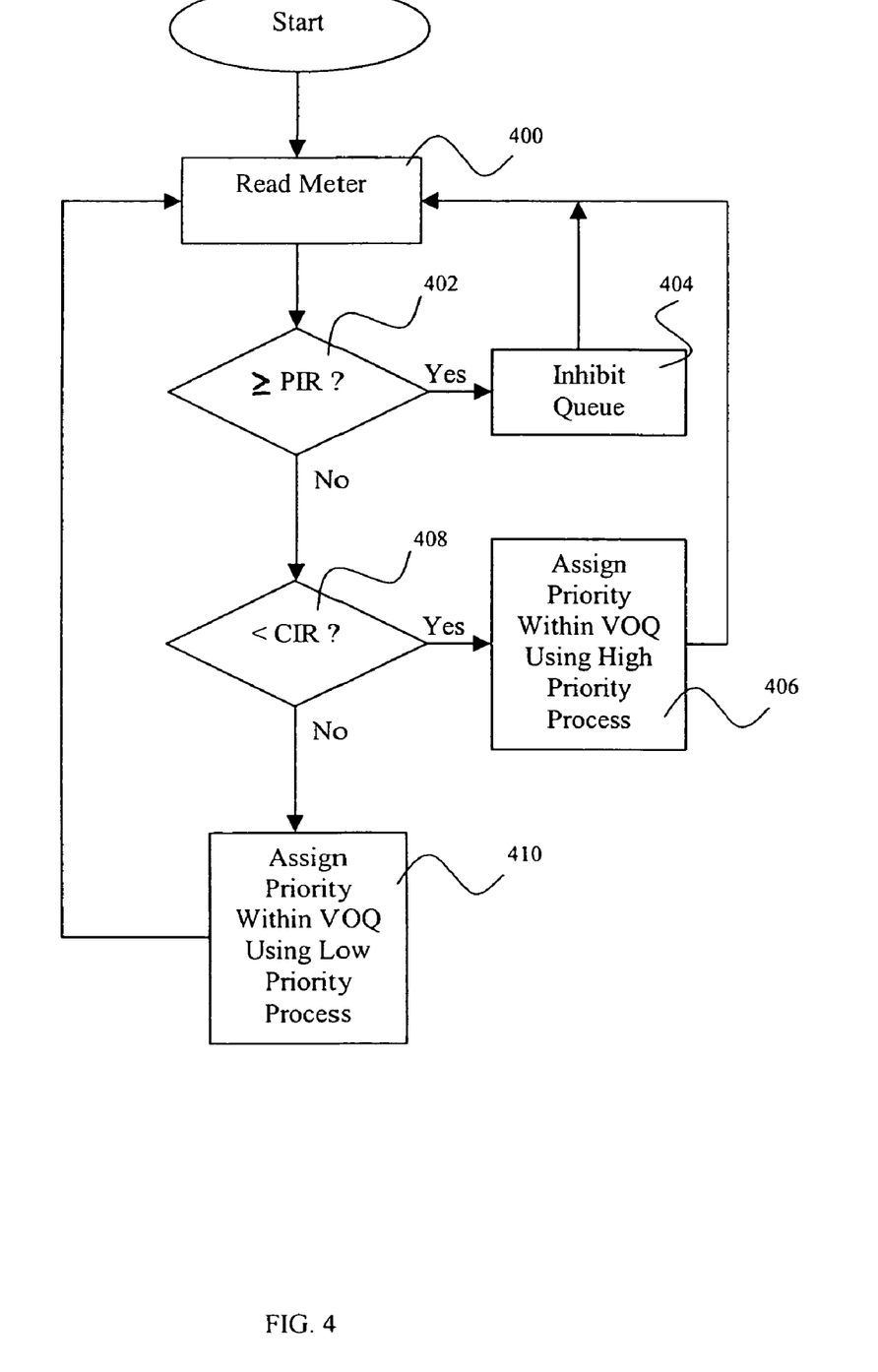
FIG. 4 is a flow diagram illustrating priority assignment for a packet.
Figure 6:
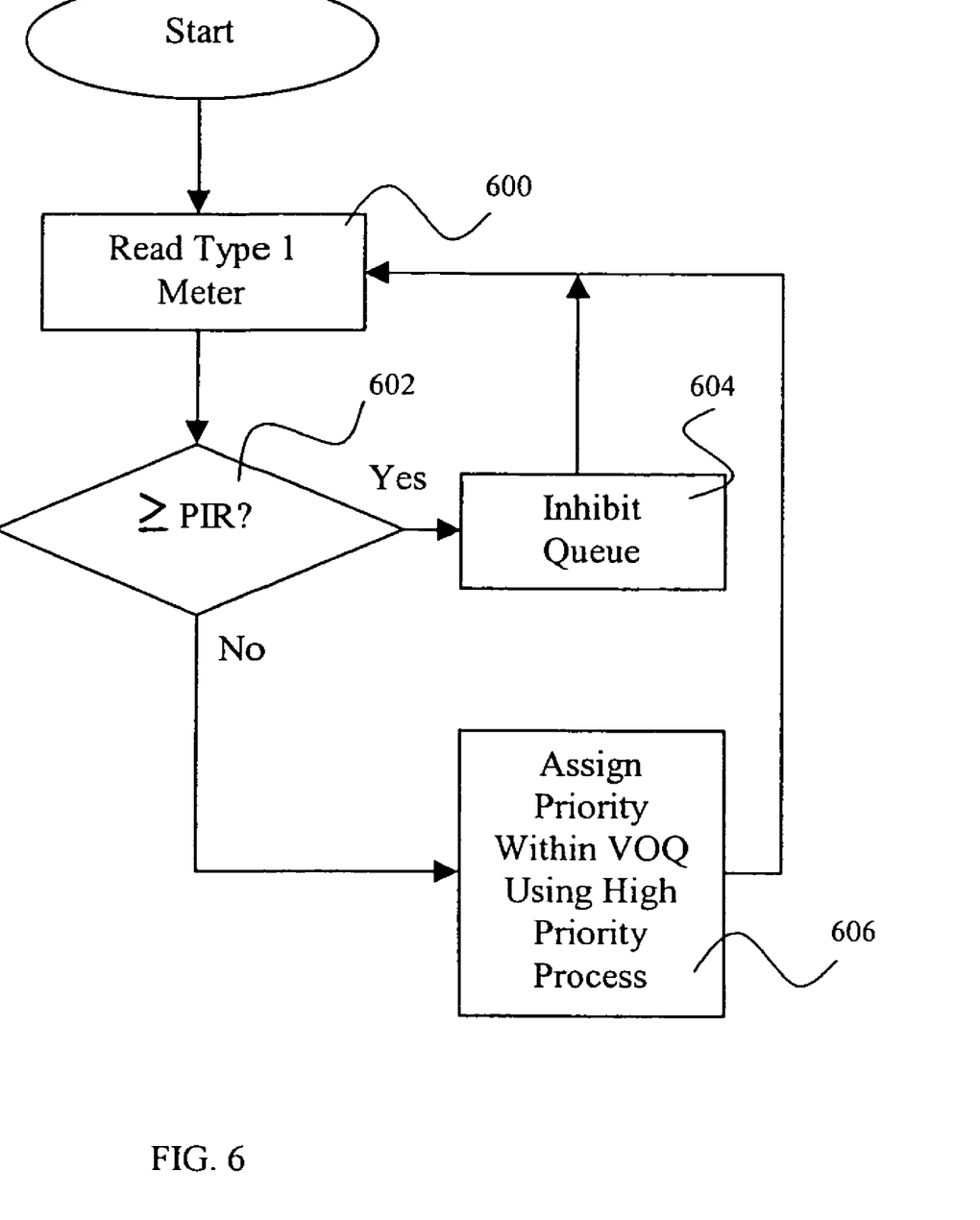
FIG. 6 is a flow diagram illustrating priority assignment for a packet in type 1 queues.
Figure 7:
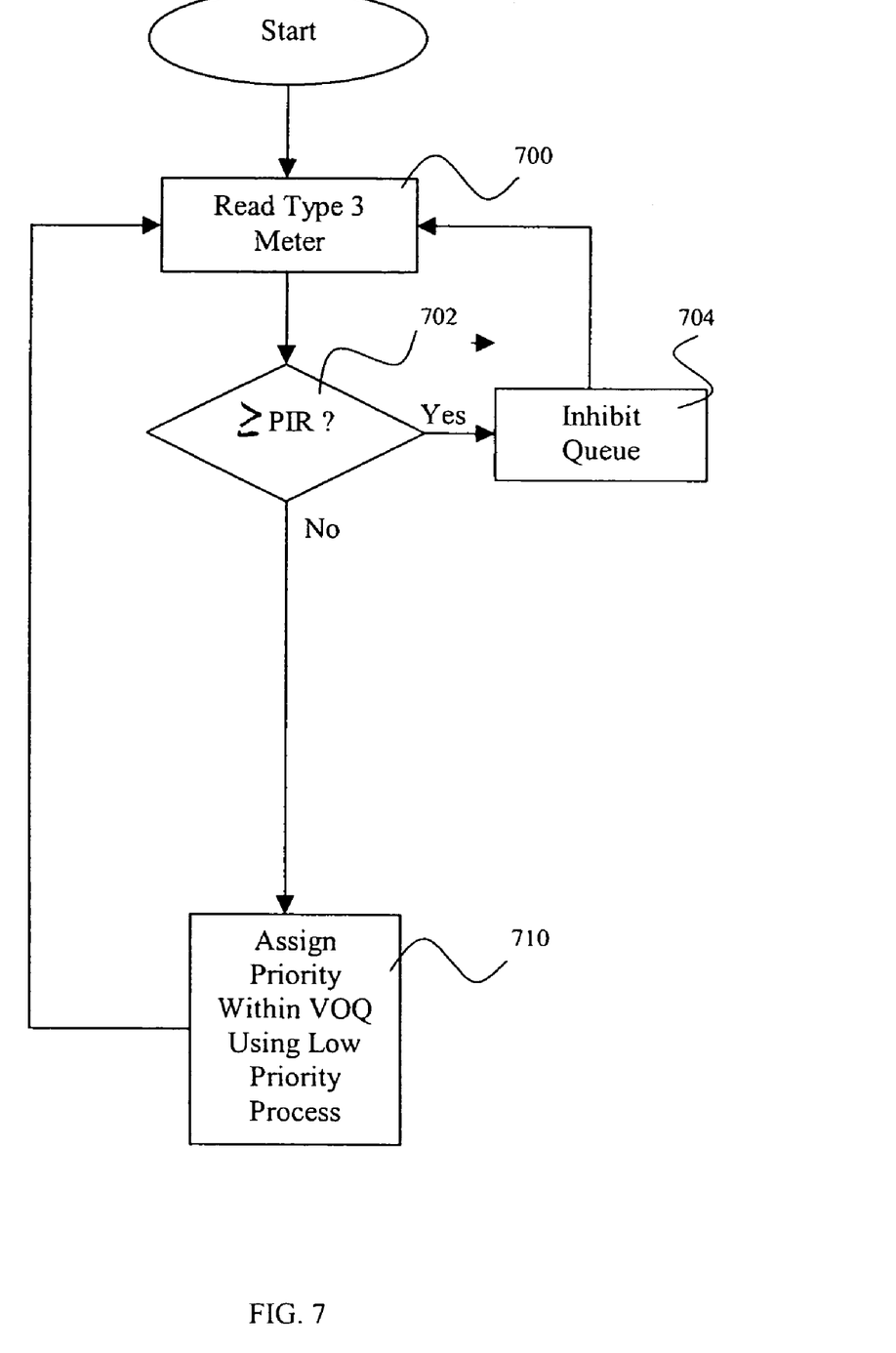
FIG. 7 is a flow diagram illustrating priority assignment for a packet in type 3 queues.

FIG. 4 is a flow diagram illustrating a process used in some embodiments to assign a priority to a packet/queue. In step 400, the meter for a given queue is checked. In step 402, the actual packet flow rate (as read from the meter) is compared to the peak information rate (PIR) allowed for that queue. If the packet flow is greater than or equal to the PIR, then, in step 404, the queue is inhibited and, in step 400, the meter is checked again. If the packet flow is less than the PIR, then in step 408 the actual packet flow rate is compared to the committed information rate (CIR) guaranteed for that queue (if any and if different than the PIR, otherwise step 408 may be omitted as shown in FIGS. 6 and 7). If the packet flow is less than the CIR, then, in step 406, the queue is assigned priority within the VOQ using a high priority scheduling process. In some embodiments, the high priority scheduling process may comprise the "conform" round robin process 306 of FIG. 3. The process then returns to step 400, in which the meter is checked again and the process repeats. If it is determined in step 408 that the packet flow rate for the queue is not less than the CIR, i.e., the CIR is being met or exceeded, then in step 410 the queue is assigned priority within VOQ using a low priority process. In some embodiments, the low priority scheduling process may comprise the "exceed" round robin process 316 of FIG. 3. The process then returns to step 400, in which the meter is checked again and the process repeats.

Figure 5:
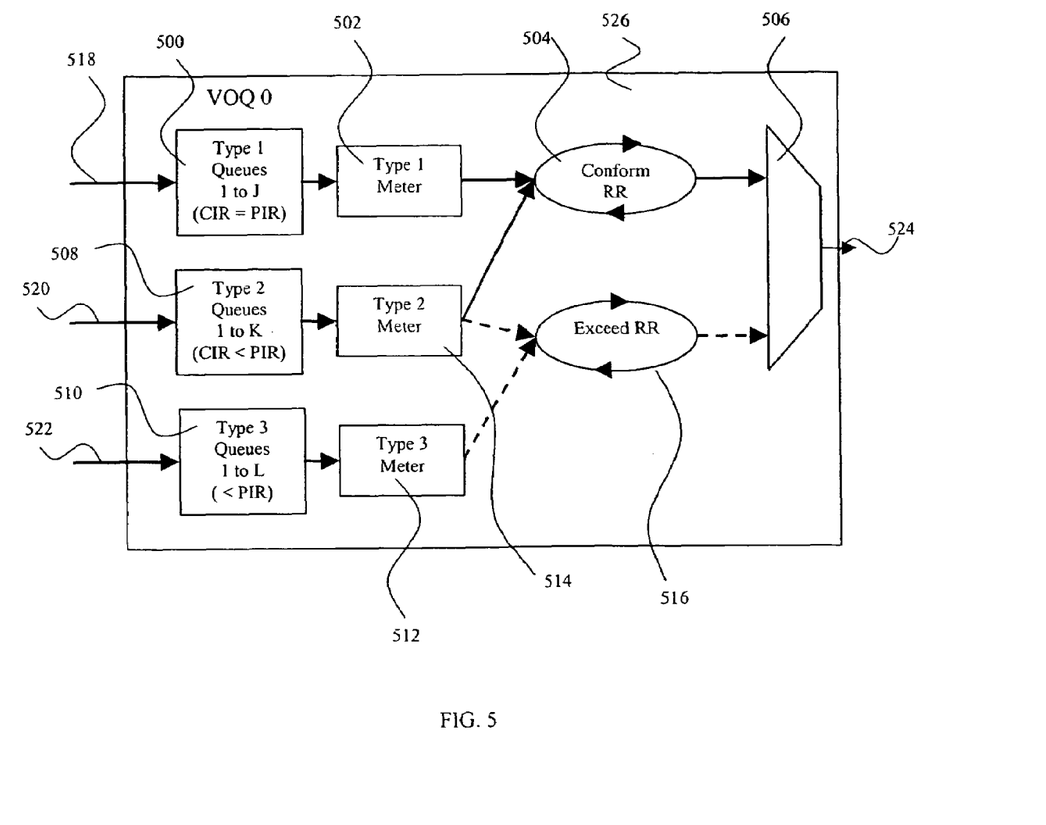
FIG. 5 is a block diagram illustrating an alternate virtual output queue.

FIG. 5 is a block diagram illustrating an embodiment of a virtual output queue. Three different types of queue are assigned to virtual output queue 526, as indicated by arrows 518, 520, and 522. In the example shown, virtual output queue 526 has assigned to it one or more type 1 queues 1 through J (500), one or more type 2 queues 1 through K (508), and one or more type 3 queues 1 through L (510). Each type 1 queue has associated with it a type 1 meter 502, which measure the packet flow associated with a given queue. Likewise each type 2 queue has associated with it a type 2 meter 514, and each type 3 queue has associated with it a type 3 meter 512. In some embodiments each meter comprises a leaky bucket meter. In some embodiments, the type 1, 2, and 3 queue meters may the same and the actual flow rate read by the respective meters used differently, depending on the queue type. In the embodiment shown, type 1 queues have a committed information rate (CIR) that is equal to the peak information rate (PIR) for the queue. Depending on the measurement made by the meter, the packets in the queue are either held (CIR=PIR being met or exceeded) or a priority is assigned to the queue based on a high priority scheduling process 504 (e.g., actual flow rate is less than CIR=PIR). For type 2 queues, the CIR is less than the PIR, and for any given type 2 queue at any given time the queue is either blocked (e.g., to ensure that flow does not exceed the PIR for the queue), assigned a priority as part of a high priority scheduling process such as "conform" round robin process 504 (e.g., to ensure that the CIR for the queue is satisfied, if the actual flow rate is less than the CIR), or assigned a priority as part of a low priority scheduling process such as "exceed" round robin process 516 (e.g., to give lower priority to queues for which the actual information rate is greater than or equal to a CIR associated with the queue). Note that type 2 queues in this example are the same as the queues shown in FIG. 3. In the example shown in FIG. 5, type 3 queues have no committed information rate (i.e., CIR=0) and it is only necessary to ensure that a type 3 queue not exceed its allotted PIR. As a result, a type 3 queue may either be blocked (e.g., if its actual flow rate meets or exceeds its PIR) or assigned a priority as part of a low priority scheduling process such as "exceed" round robin process 516. The results of the "conform" round robin process 504 and "exceed" round robin process 516 are provided as inputs into a strict priority scheduling process 506. Strict priority scheduling process 506 ensures that any queue that is not currently satisfying its CIR (and has a packet in the queue), i.e., a queue assigned to the "conform" round robin process, is assigned a higher priority than any queue for which the CIR (if any) is already being met or exceeded, i.e., any queue assigned to the "exceed" round robin process. The VOQ 526 provides as output 524 the priorities as determined by the strict priority scheduling process 506.

FIG. 6 is a flow diagram illustrating a process used in some embodiments to assign a priority for the type 1 queues shown in FIG. 5 (i.e., CIR=PIR). In step 600, the meter for a given queue is checked. In step 602, the packet flow is compared to the PIR allowed for that queue. In type 1 queues, the CIR is equal to the PIR. If the packet flow is greater than or equal to the PIR, then, in step 604, the queue is inhibited and, in step 600, the type 1 meter is checked again. If the packet flow is less than the PIR (and, by definition, the CIR, which is the same as the PIR for this type of queue), then, in step 606, the queue is assigned priority within the VOQ using a high priority process, such as the "conform" round robin 504 of FIG. 5. In step 600, the meter is then checked again and the process repeats.

In some embodiments, the process shown in FIG. 4 is used to assign a priority to a type 2 queue (i.e., CIR<PIR).

FIG. 7 is a flow diagram illustrating a process used in some embodiments to assign a priority for the type 3 queues shown in FIG. 5 (i.e., CIR=0). In step 700, the type 3 meter for a given queue is checked. In step 702, the actual packet flow rate is compared to the PIR allowed for that queue. In type 3 queues, the CIR is equal to 0. If the actual packet flow rate is greater than or equal to the PIR, then, in step 704, the queue is inhibited and, in step 700, the meter is checked again. If the packet flow is less than the PIR, then in step 710, the packet is assigned a priority within the VOQ using a low priority process, such as "exceed" round robin 516 of FIG. 5. In step 700, the meter is checked and the process repeats.

While the example shown in FIGS. 5-7 includes three different types of queue, other or different types of queue may also be defined and used. Also, the process for assigning priority as between VOQs may comprise a single level of scheduling (e.g., round robin) or may instead include multiple levels. For example, in some embodiments, the strict priority schedule processes shown in FIGS. 3 and 5 (308 and 506 respectively) may be omitted and replaced by a first round robin process for assigning priority based on the results of the respective high priority scheduling process of each respective VOQ and a second round robin process for assigning priority based on the results of the respective low priority scheduling process of each respective VOQ, with a strict (or other) priority scheduling process being used to assign priorities as between the first round robin and the second round robin. In some embodiments, the scheme used to assign priorities to ingress packets may be the same or different than the scheme used to assign priorities to egress packets.

Using the techniques described herein, network packet flow shaping may be implemented on every queue to ensure that for each queue the PIR is not exceeded and the CIR, if any, is met.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for setting packet queue priority including:
   measuring a rate for a queue,
   comparing the rate to a quality of service metric associated with the queue,
   associating the queue with a high priority scheduling process if the measured rate is determined based on the comparison with the quality of service metric to be less than a first threshold rate; and
   associating the queue with a low priority scheduling process if the measured rate is determined based on the comparison with the quality of service metric to be greater than or equal to a second threshold rate.

2. A method for setting packet queue priority as in claim 1 further comprising using a scheduling process to assign priority as between queues associated with the high priority scheduling process and queues associated with the low priority scheduling process.

3. A method for setting packet queue priority as in claim 1 wherein the high priority scheduling process and the low priority scheduling process are members of a plurality of scheduling processes each associated with a corresponding priority, the quality of service metric is one of a plurality of metrics associated with the queue, each metric being associated with at least one of said plurality of scheduling processes, and the method further comprises associating the queue with the highest priority scheduling process associated with a metric that is not being satisfied as indicated by the measured rate.

4. A method for setting packet queue priority as in claim 1 wherein measuring a rate for the queue comprises using a leaky bucket to measure the rate.

5. A method for setting packet queue priority as in claim 1 wherein the quality of service metric comprises a committed information rate.

6. A method for setting packet queue priority as in claim 1 wherein the quality of service metric comprises a committed information rate and a peak information rate.

7. A method for setting packet queue priority as in claim 1 further including associating the queue with a virtual output queue.

8. A method for setting packet queue priority as in claim 7 wherein the queue is one of a plurality of packet queues, the virtual output queue is one of a plurality of virtual output queues, and the method further includes associating each packet queue with a virtual output queue.

9. A method for setting packet queue priority as in claim 8 further comprising assigning priority as between the virtual output queues (VOQ) using an inter-VOQ scheduling process.

10. A method for setting packet queue priority as in claim 9 wherein the inter-VOQ scheduling process comprises a round robin process.

11. A method for setting packet queue priority as in claim 8 wherein each virtual output queue has associated with it a high priority scheduling process and a low priority scheduling process.

12. A method for setting packet queue priority as in claim 11 further comprising assigning priority within each virtual output queue, as between the high priority scheduling process and the low priority scheduling process associated with the virtual output queue, using a scheduling process.

13. A method for setting packet queue priority as in claim 11 further comprising assigning priority as between packet queues associated with the respective high priority scheduling processes of the respective virtual output queues (VOQ) using an inter-VOQ scheduling process.

14. A method for setting packet queue priority as in claim 8 wherein the packet queues associated with a first subset of said plurality of virtual output queues have a first priority level associated with them and the packet queues associated with a second subset of said plurality of virtual output queues have a second priority level associated with them.

15. A method for setting packet queue priority as in claim 1 wherein the first threshold rate and the second threshold rate are the same.

16. A method for setting packet queue priority as in claim 1 wherein the first threshold rate is the same as the quality of service metric.

17. A method for setting packet queue priority as in claim 1 wherein the first threshold rate comprises a committed information rate.

18. A device for setting packet queue priority including:
a meter configured to measure a rate associated with a packet queue; and
a priority assignment engine configured to:
compare the rate and a quality of service metric,
associate the queue with a high priority scheduling process if the measured rate is determined based on the comparison with the quality of service metric to be less than a first threshold rate; and
associate the queue with a low priority scheduling process if the measured rate is determined based on the comparison with the quality of service metric to be greater than or equal to a second threshold rate.

19. A computer program product for setting packet queue priority, the computer program product being embodied in a computer readable medium and comprising computer instructions for:
measuring a rate for a queue,
comparing the rate to a quality of service metric associated with the queue, and
associating the queue with a high priority scheduling process if the measured rate is determined based on the comparison with the quality of service metric to be less than a first threshold rate; and
associating the queue with a low priority scheduling process if the measured rate is determined based on the comparison with the quality of service metric to be greater than or equal to a second threshold rate.

* * * * *